United States Patent
Biebl et al.

[11] Patent Number: 5,877,421
[45] Date of Patent: Mar. 2, 1999

[54] ACCELERATION SENSOR

[75] Inventors: Markus Biebl, Augsburg; Ulrich Naeher, Munich; Christofer Hierold, Munich; Max Steger, Munich, all of Germany

[73] Assignee: Siemens Aktiengesellschaft, Munich, Germany

[21] Appl. No.: 939,358

[22] Filed: Sep. 29, 1997

Related U.S. Application Data

[62] Division of Ser. No. 603,873, Feb. 22, 1996, abandoned.

[30] Foreign Application Priority Data

Feb. 23, 1995 [DE] Germany ............... 195 06 401.1

[51] Int. Cl.$^6$ .................................................. G01P 15/00
[52] U.S. Cl. ...................................... 73/514.17; 73/514.32
[58] Field of Search ........................... 73/514.16, 514.17, 73/514.18, 514.21, 514.24, 514.32, 514.35, 514.36, 514.38; 361/280

[56] References Cited

U.S. PATENT DOCUMENTS

| | | | |
|---|---|---|---|
| 5,337,606 | 8/1994 | Bennett et al. ................ | 73/517 R |
| 5,431,051 | 7/1995 | Biebl et al. .................... | 73/517 B |
| 5,497,660 | 3/1996 | Warren ........................... | 73/514.18 |
| 5,604,313 | 2/1997 | Cahill et al. ................... | 73/514.38 |

FOREIGN PATENT DOCUMENTS

| | | |
|---|---|---|
| 0 230 198 | 7/1987 | European Pat. Off. . |
| WO 92/03740 | 3/1992 | WIPO . |
| WO 95/04284 | 2/1995 | WIPO . |

*Primary Examiner*—Hezron Williams
*Assistant Examiner*—Richard A. Moller
*Attorney, Agent, or Firm*—Hill & Simpson

[57] ABSTRACT

An acceleration sensor has a mass part movably attached over a substrate with pairs of electrodes arranged relative to the mass part so that one electrode of each pair is under the mass part and the other electrode of that pair is arranged above the mass part. The electrodes are attached immovably to the substrate. Controllable electrical voltages can be applied such via an electronic drive circuit to the electrically conductively doped mass part and to these electrodes so that excursions of the mass part can be electrostatically compensated and, at the same time, the magnitude of inertial forces acting on the mass part, and thus the magnitude of accelerations, can be measured.

20 Claims, 2 Drawing Sheets

ACCELERATION SENSOR

This is a division of application Ser. No. 08/603,873, filed Feb. 22, 1996 now abandoned.

BACKGROUND OF THE INVENTION

1. Field of the Invention

The present invention is directed to an acceleration sensor (accelerometer), preferably of silicon, of the type which can be manufactured using micromechanical manufacturing methods.

2. Description of the Prior Art

Extremely small and thus economical micromechanical acceleration sensors for acceleration measurements in the range of accelerations due to gravity require electronic circuits for the evaluation of the measured result. Such sensors are usually manufactured in a hybrid structure because a realization of the sensor and the circuit in the same substrate requires an additive manufacturing technology. The electronic circuit and the micromechanical sensor thus are successively manufactured. An improvement of the manufacturing method is thus achieved due to an integration of the method for manufacturing the sensor with the manufacturing method of the electronic components in order to thus obtain a sensor integrated on a chip with the circuit. An extremely economical method for manufacturing such integrated micromechanical systems arises from the simultaneous employment of the manufactured layers, for example of silicon, for the electronic part as well as for the micromechanical part, i.e., the mass part suspended from springs (resilient elements). For example, the deposition of a layer of polysilicon as a gate electrode in the circuit can be employed simultaneously as the layer from which the micromechanical component parts, i.e., particularly the mass part, are structured. One problem thereby arising is that the relatively thin layer provided for the electrodes of the electronic components constitutes an extremely thin movable, mechanical part. The mass part provided for the acceleration sensor, the size of the acceleration to be determined from the inertia of this mass part, will therefore not comprise adequate mechanical stability. This factor also results in the sensor having its highest sensitivity in a direction perpendicular to the substrate surface. Although in theory one could stabilize the mass part in this direction on the basis of appropriately fashioned spring from which the mass part is suspended, this could not be accomplished within the limited resolution of the lithography employed in the manufacture of these types of products. The spring-like supports manufactured in the layer provided for the structuring of the mass part, from which the mass part is suspended, cannot be manufactured so narrow that the lateral expanse is less than their vertical expanse. The mass part can therefore oscillate more easily in the direction perpendicular to the substrate than in the substrate plane. It is necessary in many applications such as, for example, navigation systems on a chip, to have an oscillatory system wherein an influence of inertial forces on the mass part causes primarily an excursion (displacement) of the mass part in the substrate plane. It is also necessary to be able to register the excursion of the mass part; this can ensue, for example, by measuring a change in the respective capacitances of capacitors formed of electrodes immovably arranged relative to the substrate or relative to the mass part.

SUMMARY OF THE INVENTION

An object of the present invention is to provide a micromechanical acceleration sensor of semiconductor material that can be integrated on the same chip with electronic components in a simple way and that is provided for measuring an acceleration in the plane of the chip.

In the inventive sensor, a mass part that is provided for determining the occurrence and magnitude of inertial forces is movably situated over a surface of a substrate. This mass part is suspended from resilient supports that are secured to this surface of the substrate. Due to the elasticity of these resilient supports, the mass part is returned into a normal (rest) position by the supports after an excursion has ensued and when an acceleration, and thus an inertial force is no longer present. The mass part together with the supports are structured from the same layer of semiconductor material, for example polysilicon or monocrystalline silicon. The thickness of this layer is dimensioned such that further portions of the layer can be employed, after structuring, as a contact layer or contact to regions that are provided as terminals for electronic components integrated on or in the same substrate. For example, the gate electrode of a field effect transistor can thus be structured from the same layer together with the mass part provided for the sensor. Due to the low layer thickness, the supports are then very elastic in the direction perpendicular to the substrate surface, so that the motion could not be limited to a plane parallel to the substrate surface without the following inventively provided structure.

In the inventive sensor, pairs of electrodes are provided for measuring the acceleration and for stabilizing the excursion of the mass part in the planes parallel to the layer plane of the mass part. These pairs of electrodes are arranged such that one of the electrodes of a pair is applied to the surface of the substrate that carries the mass part and the other of the electrodes in the pair is arranged immovably relative to the substrate at that side of the mass part facing away from the substrate. These pairs of electrodes are thus immovable relative to the substrate, and the mass part can move between the electrodes. The mass part itself is electrically conductive, for example by suitable doping, or by fashioning electrodes in the mass part, for example by a local doping or by applied, thin metallizations that are respectively electrically conductively connected to the substrate via the supports that are likewise electrically conductive, so that voltages can be applied between the pairs of electrodes firmly applied to the substrate and the mass part. The voltage between the mass part and the electrode on the substrate surface and the voltage between the mass part and the opposite electrode of the same pair can be set and readjusted independently of one another.

At least two pairs of electrodes are present. These pairs of electrodes and, possibly, the locally limited electrodes on the mass part, are arranged relative to one another such that capacitors are formed, the capacitances thereof changing at at least one pair of electrodes when the mass part experiences an excursion parallel to the surface of the substrate. This should be the case for at least one direction parallel to the substrate surface. The other of these at least two pairs of electrodes, which are immovably attached to the substrate, can likewise be arranged relative to the electrodes of the mass part such that, given excursion of the mass part in a specific direction parallel to the surface of the substrate, changes in the capacitances of the capacitors formed by these electrodes likewise occur. Alternatively, the electrodes of this further pair can be arranged such that no change in these capacitances occurs given any arbitrary excursion of the mass part parallel to the surface of the substrate.

A plurality of electrode pairs are provided in further embodiments of the inventive sensor. The mass part is preferably fashioned electrically conductive as a whole. Certain of the electrode pairs can be used for determining the magnitude of the acceleration causing inertial forces by determining the change in the appertaining capacitances given an excursion of the mass part as a result of inertial forces. These electrode pairs are advantageously situated at the edge of the mass part when the mass part is electrically conductively fashioned as a whole. If laterally limited electrodes are situated on the mass part, the electrode pairs can also be arranged in the inner area of the mass part. Further electrode pairs whose capacitances relative to the mass part do not change given arbitrary excursions of the mass part in the plane of the substrate surface are provided for electrostatically compensating inertial forces occurring in a direction perpendicular to the substrate surface by applying voltages suitable therefor, so that the mass part is always held in the same plane, i.e., at the same spacing from the substrate surface. The movement of the mass part can be restricted to a plane parallel to the substrate surface in this way. A lower mechanical stability of the mass part compared to the mass part of conventional micromechanical acceleration sensors due to the lower thickness of the layer employed for producing the mass part, can be compensated at least partially with these electrodes on the basis of electrostatic forces.

The inventive acceleration sensor therefore offers the possibility of manufacturing the movable mass part required for the determination of inertial forces from an extremely thin layer that is provided at the same time for the contacting of electronic components, which still restricting the sensitivity of the sensor essentially to the plane of the expanse of the mass part. It is of importance to this inventive concept to use electrostatic forces to support the spring action of the supports that hold the mass part over the substrate. If, conditioned by the manufacturing process, the width of the braces cannot be manufactured less than the height, which corresponds to the thickness of the material employed, the suspension in the direction perpendicular to the substrate is more elastic, i.e. softer, than parallel to the substrate surface. An excursion of the mass part perpendicular to the substrate surface, however, is undesirable. Pairs of electrodes are therefore arranged such that an excursion of the mass part perpendicular to the substrate can be prevented by the application of suitable electrical voltages between the mass part and the lower or upper cooperating electrode. An electrostatic force opposite a deflecting force, and which that compensates this deflecting force, thus always holds the mass part in the same plane, i.e., at the same distance from the substrate. The use of a plurality of pairs of electrodes employed as cooperating electrodes at various locations of the mass part has the further advantage that the mass part can also be stabilized with respect to tilting relative to the substrate.

The magnitude electrical voltages between the mass part and the cooperating electrodes of the electrode pairs fixed relative to the substrate that are needed for compensating the forces acting perpendicularly to the substrate is a direct measure of the accelerations acting perpendicularly to the substrate. Simultaneously with the compensation of an inertial force acting perpendicularly to the substrate, the magnitude of the acceleration causing this inertial force can therefore also be identified, this making it possible to employ the inventive sensor for a three-dimensional acquisition of accelerations.

Voltages can be applied between the immovably applied electrodes and the mass part by means of an electronic circuit provided for the operation of the sensor and can be re-adjusted, so that the mass part is always held centrally between the electrode pairs, the sensitivity of the sensor for accelerations in the plane of the substrate surface thereby always being preserved. The surface of the substrate only need be sufficiently planar so that the movement of the mass part is possible. As used herein "plane of the surface of the substrate" means the at least approximately planar top side of the substrate facing toward the mass part or a plane that corresponds to the layer plane of a layer structure at this top side. The lower electrodes of the electrode pairs are respectively fashioned at or in this surface of the substrate. The electrodes arranged lying opposite these electrodes on the side of the mass part facing away from the substrate can, for example, be fashioned in a layer that covers this mass part.

In the manufacture of the sensor, an auxiliary layer or layers, the layer provided for the structuring of the mass part, and the layer provided for these upper electrodes are successively applied on top of one another and are structured, for example on the top side of the substrate. The auxiliary layers are subsequently removed, so that the mass part is freely movable at the same distance from the lower and from the upper electrodes. Techniques that are standard in the manufacture of micromechanical components can be utilized.

In order to measure the movement of the mass part in the plane of the substrate surface, pairs of electrodes are preferably provided whose capacitances change given a corresponding excursion of the mass part. The change in these capacitances ensues on the basis of the geometrical arrangement of the electrodes in that the areas or surfaces of the capacitors formed by the respective electrodes with the mass part, or with the electrodes arranged in the mass part, change. These pairs of electrodes must therefore be limited in the direction in which the excursion of the mass part is to be acquired. A plurality of pairs of such electrodes can be provided in order to be able to identify the excursion of the mass part in various directions in the plane of the substrate surface. Similar to the electrostatic compensation of inertial forces occurring perpendicularly to the substrate surface, it is also possible to electrostatically compensate inertial forces acting in this substrate surface. An acceleration occurring in the plane of the substrate surface can be measured in this way without the mass part being subjected to excursion. The electrode pairs provided for the this electrostatic compensation, however, must then be aligned such that an excursion of the mass part in this plane would result in a change of the capacitances of the capacitors formed by the electrodes together with the mass part. The electrical voltages or voltage changes needed for this electrostatic compensation of the inertial forces are thereby a measure of the accelerations.

It can be provided in embodiments of the inventive sensor that the same electrode pairs that prevent an excursion of the mass part perpendicularly to the substrate with electrostatic forces are also employed for the measurement of the acceleration in the plane of the substrate surface. In this case, the arrangement of the various electrodes is simplified at the expense of a more complicated circuit technology that is then required, and which must then simultaneously utilize one electrode pair for measuring the acceleration and for the compensation of vertical and lateral excursions of the mass part.

Given an excursion of the mass part in the direction perpendicular to the substrate surface as a result of an acceleration in this direction, the capacitances of the capacitors that are formed by the two electrodes of an electrode part and the mass part, or a third electrode arranged in the mass part, change. The capacitances can be identified, for example, by connecting the capacitors formed by respective electrode pairs so as to form an element of an electrical resonant circuit and the capacitance is identified by monitoring departures from a nominal resonant frequency. A change in the capacitance can be determined in this way. When the capacitances between the electrode of the mass part and the second electrode of an electrode pair change as a result of an excursion of the mass part in a direction perpendicular to the substrate, an electrostatic force can be produced by applying appropriate, different electrical voltages between these electrodes such that the excursion of the mass part is negated.

For determining a lateral excursion of the mass part, i.e. an excursion in the layer plane of the mass part or in the plane of the substrate surface, the capacitance between the movable electrode of the mass part (or the entire mass part) and the lower or upper electrode of an electrode pair that is immovably connected to the substrate, are identified and, for example, compared to the capacitance of an electrode pair at the opposite edge of the mass part. Given vertical excursions (in a direction perpendicular to the substrate), the voltages applied to the lower and upper electrodes relative to the mass part are varied in opposite directions for compensating the excursion; given lateral excursions, the voltages are varied in the same direction. An electrostatic compensation of the inertial force deflecting the mass part is only possible, however, when one electrode pair is arranged such that an excursion of the mass part to be compensated would produce a reduction in the capacitances of the capacitors formed by these electrodes with the mass part. Using a single arrangement of electrode pairs and suitable electronic circuits, it is thus possible to acquire accelerations in three directions perpendicular to one another with the inventive sensor and also to suppress unwanted excursion of the mass part.

The manufacture of the inventive sensor can ensue with process steps that are simultaneously undertaken for the manufacture of the electronic part and for the manufacture of the mechanical part of the chip. The micromechanical structure of the sensor can also be manufactured by manufacturing methods separate from the electronic part or by a process provided only for these mechanical components. Given integration of the sensor with a bipolar transistor, for example, the plurality of lower electrodes provided for the sensor in the substrate can be produced together with the doped region (buried layer) provided for the collector, the mass part can be produced in the polysilicon layer provided for the base terminal, and the layer provided for the upper electrodes of the sensor that are immovably connected to the substrate can be produced as polysilicon layer together with the deposition of the emitter polysilicon. In this case, the mass part is manufactured as a comparatively thin layer because the base polysilicon is likewise deposited only as a relatively thin layer. The employment of the electrode pairs in accordance with the invention for vertical stabilization of the mass part is therefore especially advantageous in this integration.

DESCRIPTION OF THE PREFERRED EMBODIMENTS

Figure 1:
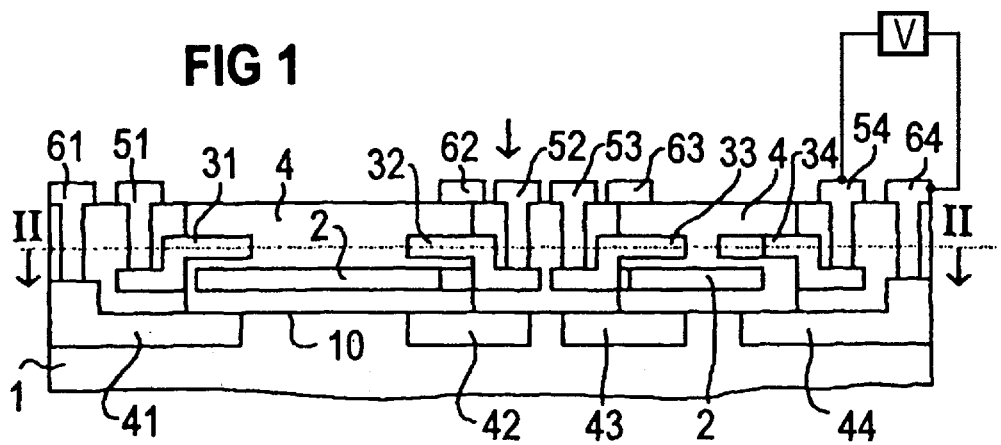
FIG. 1 shows an inventive sensor in cross-section (but without hatching).

In the sensor shown in FIG. 1, the movable mass part 2 is arranged over the surface 10 of a substrate 1. In this embodiment, the mass part 2 has a centrally disposed window-like recess in which further component parts provided for the sensor are firmly arranged on the surface 10 of the substrate 1. Electrodes 41, 42, 43 and 44 are formed as doped regions in this embodiment at the surface 10—which is shown "ideally" planar as an example—in the substrate 1 that can be a semiconductor wafer or a semiconductor layer structure. These electrodes are provided with corresponding electrical terminals 61, 62, 63 and 64. As shown in the example, these electrical terminals can be conducted onto a planarized surface of the component, or can be conducted, for example, at the surface 10 to electronic components that are integrated on the substrate 1. Upper electrodes 31, 32, 33 and 34 that project beyond the mass part 2 at the side of the mass part 2 facing away from the substrate 1, are provided respectively as cooperating electrodes for each of these electrodes arranged in the substrate 1 and forming electrode pairs therewith. The mass part 2 is thus movably arranged between pairs of electrodes 31 and 41, 32 and 42, 33 and 43, 34 and 44 allocated to one another. The upper electrodes are provided with respective electrical terminals 51, 52, 53 and 54 that are likewise conducted onto a planarized surface of the component in this example. The mass part 2 is arranged in a recess of this planarization here. The upper electrodes 31, 32, 33 and 34 are respectively present only in registry with regions in which the lower electrodes 41, 42, 43 and 44 are present. It is also possible for a layer to be located above the mass part 2, the upper electrodes being formed in this layer as limited, doped regions. In the illustrated example, the electrical connections between the illustrated, middle lower electrodes 42 and 43 and their associated, upper terminal contacts 62 and 63 are displaced out of the plane of the drawing toward the back behind the rear sidewall 4 of the recess provided for the mass part 2, and are covered by a passivation layer at that location. The middle upper electrodes 32 and 33 are secured on the substrate 1 in the inside of the window-like recess of the mass part 2.

Figure 2:
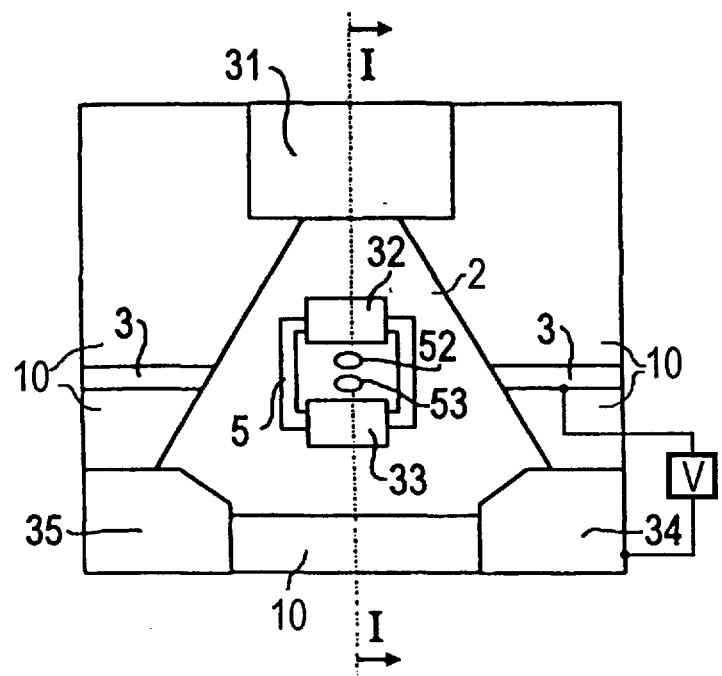
FIG. 2 shows a portion of the sensor of FIG. 1 taken along line II—II in FIG. 1, and containing line I—I along which the section shown in FIG. 1 is taken.

FIG. 2 shows an excerpt from the sectional view of FIG. 1 that is limited to the recess provided for the mass part 2. It can be seen from FIG. 2 that the mass part 2 is in the form of a triangle in this exemplary embodiment. The inner upper electrodes 32 and 33 are secured to the substrate 1 and are provided with the electrical terminals 52 and 53 within the window-like recess 5 of this mass part 2. The other upper electrodes 31, 34 and 35 respectively project over the corners of the mass part 2. The mass part 2 is secured to supports 3 on the substrate 1. The approximate position of these supports 3 is indicated in FIG. 1 by the arrow shown above the component.

The sensor of this exemplary embodiment is particularly provided for determining acceleration in the direction perpendicular to the alignment of the supports 3. The inner electrode pairs, the upper electrodes 32 and 33 thereof being visible in FIG. 2, are employed for electrostatic compensation of an excursion of the mass part 2 in this direction, whereby the magnitude of the acting inertial force and, therefrom, the magnitude of the acceleration, are simultaneously determined. In this exemplary embodiment, the other electrode pairs—the upper electrodes 31, 34 and 35 thereof being visible in FIG. 2—serve the purpose of suppressing vertical excursions of the mass part 2 (i.e., excursions ensuing perpendicularly to the plane of the drawing)

and for the mechanical stabilization of the mass part 2. Given the illustrated geometrical arrangement of the electrode pairs, however, changes in the capacitance between the upper electrode and the mass part 2 in at least one of the electrode pairs arranged at the corners of the mass part 2 will occur given every excursion of the mass part 2 in the plane of the drawing, so that these electrode pairs can also be utilized for measuring the acceleration. The mass part 2 can be fashioned electrically conductive as a whole or only in the regions of the mass part 2 overlapped by (in registry with) the electrode pairs. The electrical connection of the mass part 2, if conductive as a whole, or of the electrically conductive regions of the mass part 2, ensues via the supports 3 that carry the mass part 2, which are likewise fashioned electrically conductive. It should be noted that other supports 3 in addition to those shown in FIG. 2 can be provided in this exemplary embodiment.

A circuit is connected to the component shown in FIGS. 1 and 2 for establishing a voltage, which can be varied, across the respective terminals for each of the aforementioned pairs of electrodes. The establishment of such a variable voltage is schematically indicated in FIG. 1 by a voltage source V connected across terminals 54 and 64, thereby establishing a voltage across electrodes 34 and 44, and a similar arrangement is provided for all of the other electrode pairs. Moreover, this voltage source V can also be connected to the mass part 2 via the supports 3 in order to establish sub-voltages between the electrode 34 and the mass part 2 and between the mass part 2 and the electrode 44 for use in electrostatically compensating the mass part 2, as described in more detail below. Again, a similar arrangement can be provided for any of the other terminal pairs as well.

Figure 3:
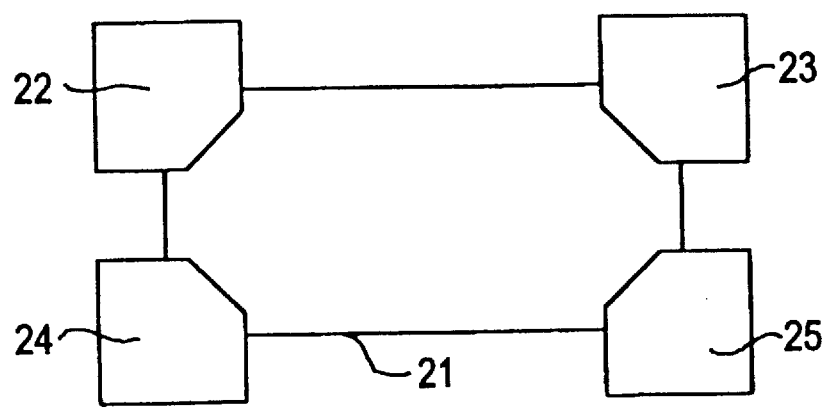
FIGS. 3 and 4 respectively show schematic illustrations of embodiments of the inventive sensor with typical arrangements of the electrodes in plan views.

FIG. 3 shows a schematic illustration of an embodiment having a rectangular mass part 21, with an electrode pair being arranged at each corner thereof. The respective upper electrodes 22, 23, 24 and 25 of these electrode pairs are visible in FIG. 3. These electrode pairs can each simultaneously serve for the compensation of vertical excursion of the mass part 21 and for the determination of an excursion or inertial force in the plane of the drawing.

Figure 4:
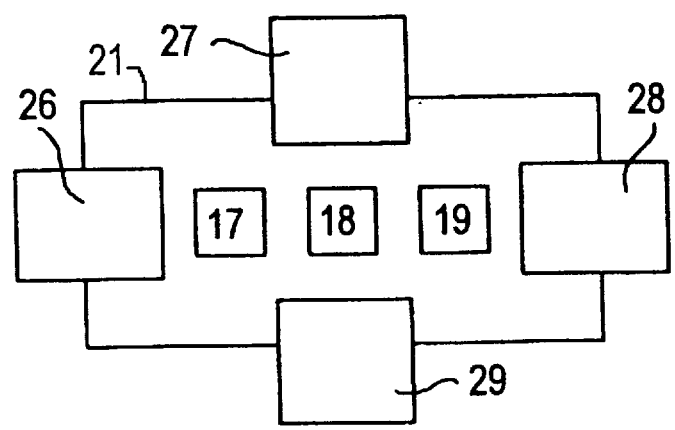

The rectangular mass part 21, for example, can be fashioned as a large area electrode completely electrically conductively doped. In the embodiment of FIG. 4 four outer electrode pairs which partially overlap the mass part 21 are provided, such as at a central location of each edge of the mass part 21. The respective upper electrodes 26, 27, 28 and 29 of these outer electrode pairs can be seen in FIG. 4. Three inner electrode pairs which completely overlap the mass part 21 are also provided. The respective upper electrodes 17, 18 and 19 of these inner electrode pairs can be seen in FIG. 4. Given an excursion of the mass part 21 in the plane of the drawing, the areas of the capacitors formed by these electrode pairs with the mass part 21 will therefore remain constant in the case of the inner electrode pairs, whereas the capacitor areas at at least one of the outer electrode pairs will change. The inner electrode pairs are only employed for the electrostatic compensation of a possible excursion of the mass part 21 perpendicularly to the plane of the drawing. The outer electrode pairs partially overlapping the region of the mass part 21 can be employed for determining an acceleration of the mass part 21 ensuing in the plane of the drawing, whereby an excursion of the mass part 21 can be simultaneously prevented. These outer electrode pairs can also be utilized to prevent a vertical excursion (perpendicularly to the plane of the drawing) as support for the inner electrode pairs.

The electrode pairs provided in the various embodiments for an electrostatic compensation of the excursion of the mass part in the plane of the substrate surface need not be arranged at an outer edge of the mass part; rather, as shown in FIG. 2, they can be arranged at the edge of some kind of recess of the mass part that can also be open to the side. Electrode pairs that, like the inner electrode pairs of the exemplary embodiment of FIG. 4, are completely arranged in the region occupied by the mass part 21 can—given every excursion of the mass part—also be used for determining the size of the acceleration when the mass part 21 is not electrically conductive as a whole, but has laterally limited electrodes. In the exemplary embodiment of FIG. 4, these electrodes fashioned in the mass part 21 can, for example, be arranged limited to the region of the mass part 21 overlapped by (in registry with) the inner electrode pairs. Locally limited electrodes can be produced in the layers, for example by a locally limited doping of the semiconductor material (for example, silicon) employed for the layers.

It should be noted that those surfaces of the electrodes of an electrode pair rigidly applied to the substrate that respectively face toward the mass part need not be of the same size in all embodiments of the inventive sensor.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for operating an acceleration sensor comprising the steps of:

resiliently mounting a mass part by supports over a surface of a semiconductor substrate so that said mass part is movable in a plane above and substantially parallel to said surface of said substrate, said mass part having a first side facing the substrate and a second side facing away from the substrate, and said mass part having a rest position relative to the substrate when no inertial forces are acting on the mass part;

immovably mounting a plurality of pairs of electrons relative to said substrate, with each electrode of each pair being immovable relative to said substrate, and spacing one electrode of each pair from the first side of the mass part and spacing one electrode in each pair from said second opposite side of said mass part;

overlapping each electrode of each pair with a respective portion of the mass part and making the mass part electrically conductive at least in each respective portion;

mounting the electrodes of at least one pair of said plurality of pairs of electrodes relative to the substrate for causing, for said rest position and for every possible excursion of said mass part from said rest position in said plane, the electrodes of said at least one of said pairs to always overlap said mass part, and for causing a size of an overlap of said mass part by said electrodes of said at least one of said pairs to change continuously dependent on excursions of said mass part from said rest position in at least one direction in said plane; and establishing a variable voltage across the electrodes in each pair and regulating said voltage for electrostatically compensating an inertial force acting on said mass part in a direction perpendicular to said surface of said substrate.

2. A method as claimed in claim 1 wherein the step of immovably mounting a plurality of pairs of electrodes relative to said substrate comprises immovably mounting the electrodes of each of at least two pairs of said plurality of pairs of electrodes relative to said substrate for causing, for said rest position and for every possible excursion of said mass part in said plane, the electrodes of said at least two of said pairs to always overlap said mass part, and for causing a size of an overlap of said mass part of said electrodes of each of said two of said pairs to change continuously dependent on excursions of said mass part from said rest position in at least one direction in said plane.

3. A method as claimed in claim 1 comprising the additional step of mounting the electrodes of at least one further pair of said plurality of pairs of electrodes relative to said substrate for causing, for said rest position and for every possible excursion of said mass part, the electrodes of said at least one further pair to always overlap said mass part, and for causing a size of an overlap of said mass part by said electrodes of said at least one further pair to change continuously dependent on excursions of said mass part from said rest position in at least one direction in said plane.

4. A method as claimed in claim 1 comprising the additional steps of:
establishing a voltage between said mass part and each of the electrodes in at least one pair of electrodes for producing a capacitor having a capacitance which changes dependent on an area of said overlap of the electrodes forming the capacitance dependent on the excursion of said mass part; and
identifying a magnitude of said excursion by monitoring said change in said capacitance.

5. A method of operating an acceleration sensor comprising the steps of:
resiliently mounting a mass part by supports over a surface of a semiconductor substrate so that said mass part is movable in a plane above and substantially parallel to said surface of said substrate, said mass part having a first side facing the substrate and a second side facing away from the substrate, and said mass part having a rest position relative to the substrate when no inertial forces are acting on the mass part;
immovably mounting a plurality of pairs of electrodes relative to said substrate, with each electrode of each pair being immovable relative to said substrate, and spacing one electrode of each pair from the first side of the mass part and spacing one electrode in each pair from said second opposite side of said mass part;
overlapping each electrode of each pair with a respective portion of the mass part and making the mass part electrically conductive at least in each respective portion so that the electrodes of a first of said pairs and said mass part have first capacitances therebetween and the electrodes of a second of said pairs and said mass part have second capacitances therebetween;
mounting the electrodes so that, for every excursion of said mass part in at least one direction in said plane, the overlaps of said mass part by said electrodes of said first of said pairs change continuously and oppositely to the overlaps of said mass part of said electrodes of said second of said pairs, dependent on said excursion of said mass part from said rest position, and for causing the overlap of said first par of electrodes relative to said mass part to change oppositely to the overlap of said second pair of electrodes relative to said mass part during the excursion of said mass part;
comparing the capacitances between the electrodes of said first pair and the mass part to the capacitances between the electrodes of said second pair and the mass part to determine a change in said capacitances and to measure said excursion of said mass part; and
regulating respective voltages across said first pair of electrodes and across said second pair of electrodes for electrostatically compensating an inertial force acting on the mass part in a direction parallel to said surface of said substrate for every excursion of said mass part and for electrostatically compensating inertial forces acting on said mass part in a direction perpendicular to said surface of said substrate.

6. A method as claimed in claim 5 wherein the step of immovably mounting a plurality of pairs of electrodes relative to said substrate comprises immovably mounting the electrodes of each of at least two pairs of said plurality of pairs of electrodes relative to said substrate for causing, for said rest position and for every possible excursion of said mass part in said plane, the electrodes of said at least two of said pairs to always overlap said mass part, and for causing a size of an overlap of said mass part of said electrodes of each of said two of said pairs to change continuously dependent on excursions of said mass part from said rest position in at least one direction in said plane.

7. A method as claimed in claim 5 comprising the additional step of mounting the electrodes of at least one further pair of said plurality of pairs of electrodes relative to said substrate for causing, for said rest position and for every possible excursion of said mass part, the electrodes of said at least one further pair to always overlap said mass part, and for causing a size of an overlap of said mass part by said electrodes of said at least one further pair to change continuously dependent on excursions of said mass part from said rest position in at least one direction in said plane.

8. A method for operating an acceleration sensor comprising the steps of:
resiliently mounting a mass part by supports over a surface of a semiconductor substrate so that said mass part is movable in a plane above and substantially parallel to said surface of said substrate, said mass part having a first side facing the substrate and a second side facing away from the substrate, and said mass part having a rest position relative to the substrate when no inertial forces are acting on the mass part;
immovably mounting first, and second pairs of electrodes relative to said substrate, with each electrode of each pair being immovable relative to said substrate, and spacing one electrode of each pair from the first side of the mass part and spacing one electrode in each pair from said second opposite side of said mass part;
overlapping each electrode of each pair with a respective portion of the mass part and making the mass part electrically conductive at least in each respective portion;
mounting the electrodes of at least one of said first and second pairs of electrodes relative to the substrate for causing, for said rest position and for every possible excursion of said mass part from said rest position in said plane, the electrodes of said at least one of said first and second pairs to always overlap said mass part, and for causing a size of an overlap of said mass part by said electrodes of said at least one of said first and second pairs to change continuously dependent on excursions of said mass part from said rest position in at least one direction in said plane, and for causing the overlap of said first pair of electrodes relative to said mass part to change oppositely to the overlap of said second pair of electrodes relative to said mass part during the excursion of said mass part; and regulating respective voltages across said first pair of electrodes and across said second pair of electrodes for electrostatically compensating an inertial force acting on the mass part in a direction parallel to said surface of said substrate for every excursion of said mass part and for electrostatically compensating inertial forces acting on said mass part in a direction perpendicular to said surface of said substrate.

9. A method as claimed in claim 8 wherein the step of immovably mounting first and second pairs of electrodes relative to said substrate comprises immovably mounting the electrodes of each of said first and second pairs of electrodes relative to said substrate for causing, for said rest position and for every possible excursion of said mass part in said plane, the electrodes of said firsthand second pairs of electrodes to always overlap said mass part, and for causing a size of an overlap of said mass part of said electrodes of each of said first and second pairs of electrodes to change continuously dependent on excursions of said mass part from said rest position in at least one direction in said plane.

10. A method as claimed in claim 8 comprising the additional step of mounting electrodes of at least one further pair of electrodes relative to said substrate for causing, for said rest position and for every possible excursion of said mass part, the electrodes of said at least one further pair of electrodes to always overlap said mass part, and for causing a size of an overlap of said mass part by said electrodes of said at least one further pair of electrodes to change continuously dependent on excursions of said mass part from said rest position in at least one direction in said plane.

11. A method as claimed in claim 8 comprising the additional steps of:

establishing a voltage between said mass part and each of the electrodes in at least one pair of electrodes of said first and second pairs of electrodes for producing a capacitor having a capacitance which changes dependent on an area of said overlap of the electrodes forming the capacitance dependent on the excursion of said mass part; and identifying a magnitude of said excursion by monitoring said change in said capacitance.

12. A method for operating an acceleration sensor comprising the steps of:

resiliently mounting a mass part by supports over a surface of a semiconductor substrate so that said mass part is movable in a plane above and substantially parallel to said surface of said substrate, said mass part having a first side facing the substrate and a second side facing away from the substrate, and said mass part having a rest position relative to the substrate when no inertial forces are acting on the mass part;

immovably mounting a plurality of pairs of electrodes relative to said substrate, with each electrode of each pair being immovable relative to said substrate, and spacing one electrode of each pair from the first side of the mass part and spacing one electrode in each pair from said second opposite side of said mass part;

overlapping each electrode of each pair with a respective portion of the mass part and making the mass part electrically conductive at least in each respective portion so that the electrodes of a first of said pairs and said mass part have first capacitances therebetween and the electrodes of a second of said pairs and said mass part have second capacitances therebetween;

mounting the electrodes so that, for every excursion of said mass part in at least one direction in said plane, the overlaps of said mass part by said electrodes of said first of said pairs change continuously and oppositely to the overlaps of said mass part by said electrodes of said second of said pairs, dependent on said excursion of said mass part from said rest position;

comparing the capacitances between the electrode of said first pair and the mass part to the capacitances between the electrodes of said second pair and the mass part determine a change in said capacitances and to measure said excursion of said mass part; and establishing a variable voltage across the electrodes in each pair and regulating said voltage for electrostatically compensating an inertial force acting on said mass part in a direction perpendicular to said surface of the substrate.

13. A method as claimed in claim 12 wherein the step of immovably mounting a plurality of pairs of electrodes relative to said substrate comprises immovably mounting the electrodes of each of at least two pairs of said plurality of pairs of electrodes relative to said substrate for causing, for said rest position and for every possible excursion of said mass part in said plane, the electrodes of said at least two of said pairs to always overlap said mass part, and for causing a size of an overlap of said mass part of said electrodes of each of said two of said pairs to change continuously dependent on excursions of said mass part from said rest position in at least one direction in said plane.

14. A method as claimed in claim 12 comprising the additional step of mounting the electrodes of at least one further pair of said plurality of pairs of electrodes relative to said substrate for causing, for said rest position and for every possible excursion of said mass part, the electrodes of said at least one further pair to always overlap said mass part, and for causing a size of an overlap of said mass part by said electrodes of said at least one further pair to change continuously dependent on excursions of said mass part from said rest position in at least one direction in said plane.

15. A method for operating an acceleration sensor comprising the steps of:

resiliently mounting a mass part by supports over a surface of a semiconductor substrate so that said mass part is movable in a plane above and substantially parallel to said surface of said substrate, said mass part having a first side facing the substrate and a second side facing away from the substrate, and said mass part having a rest position relative to the substrate when no inertial forces are acting on the mass part;

immovably mounting a plurality of pairs of electrodes relative to said substrate, with each electrode of each pair being immovable relative to said substrate, and spacing one electrode of each pair from the first side of the mass part and spacing one electrode in each pair from said second opposite side of said mass part;

overlapping each electrode of each pair with a respective portion of the mass part and making the mass part electrically conductive at least in each respective portion;

mounting the electrodes so that, for every excursion of said mass part in at least one direction in said plane, the overlaps of said mass part by said electrodes of a first of said pairs change continuously and oppositely to the overlaps of said mass part by said electrodes of a second of said pairs, dependent on said excursion of said mass part from said rest position, and the areas of the overlaps of said mass part by said electrodes of a third of said pairs remain constant;

establishing a variable voltage across the electrodes of said third pair and regulating said voltage for electrostatically compensating an inertial force acting on said mass part in a direction perpendicular to said surface of the substrate; and comparing the capacitances between the electrodes of said first pair and the mass part to the capacitances between the electrodes of said second pair and the mass part to determine a change in said capacitances and to measure said excursion of said mass part.

16. A method as claimed in claim 15 wherein the step of immovably mounting a plurality of pairs of electrodes relative to said substrate comprises immovably mounting the electrodes of each of at least two pairs of said plurality of pairs of electrodes relative to said substrate for causing, for said rest position and for every possible excursion of said mass part in said plane, the electrodes of said at least two of said pairs to always overlap said mass part, and for causing a size of an overlap of said mass part of said electrodes of each of said two of said pairs to change continuously dependent on excursions of said mass part from said rest position in at least one direction in said plane.

17. A method as claimed in claim 15 comprising the additional step of mounting the electrodes of at least one further pair of said plurality of pairs of electrodes relative to said substrate for causing, for said rest position and for every possible excursion of said mass part, the electrodes of said at least one further pair to always overlap said mass part, and for causing a size of an overlap of said mass part by said electrodes of said at least one further pair to change continuously dependent on excursions of said mass part from said rest position in at least one direction in said plane.

18. A method as claimed in claim 15 comprising the additional step of:

establishing a variable voltage across the electrodes in each pair and regulating said voltage for electrostatically compensating an inertial force acting on said mass part in a direction perpendicular to said surface of the substrate.

19. A method as claimed in claim 15 comprising the additional steps of:

establishing a voltage between said mass part and each of the electrodes in at least one pair of electrodes for producing a capacitor having a capacitance which changes dependent on an area of said overlap of the electrodes forming the capacitance dependent on the excursion of said mass part; and identifying a magnitude of said excursion by monitoring said change in said capacitance.

20. A method as claimed in claim 15 wherein said pairs of electrodes include first and second pairs of electrodes, and wherein the step of mounting the electrodes of at least one pair of electrodes of said plurality of pairs of electrodes comprises mounting said first pair of electrodes and said second pair of electrodes for causing the overlap of said first pair of electrodes relative to said mass part to change oppositely to the overlap of said second pair of electrodes relative to said mass part during the excursion of said mass part, and comprising the additional step of regulating respective voltages across said first pair of electrodes and across said second pair of electrodes for electrostatically compensating an inertial force acting on the mass part in a direction parallel to said surface of said substrate for every excursion of said mass part and for electrostatically compensating inertial forces acting on said mass part in a direction perpendicular to said surface of said substrate.

* * * * *